UNITED STATES PATENT OFFICE.

JOSEPH W. WEITZENKORN, OF WASHINGTON, PENNSYLVANIA.

PROCESS OF PRODUCING MOLYBDENUM TRIOXID.

1,401,932.  Specification of Letters Patent.  Patented Dec. 27, 1921.

No Drawing.  Application filed June 14, 1920. Serial No. 388,786.

*To all whom it may concern:*

Be it known that I, JOSEPH W. WEITZENKORN, a resident of Washington, in the county of Washington and State of Pennsylvania, have invented a new and useful Improvement in Processes of Producing Molybdenum Trioxid, of which the following is a specification.

The invention relates to the manufacture of molybdenum trioxid, which, as such, may be used for various purposes or may be reduced by hydrogen, or otherwise, to pure or substantially pure metallic molybdenum suitable for lamp filaments, etc., or for forming various alloys.

The object of the invention is to provide a process whereby molybdenum trioxid, substantially free from impurities, may be economically recovered directly from molybdenite.

In the practice of the process molybdenite and a metallic oxid, such as iron oxid, but preferably an oxid of manganese such as manganese dioxid, are suitably reduced to substantially a powdered state, and, after being mixed in proper relative proportions, are charged into a heating receptacle which may be of any desired form, but which is preferably an electric furnace of the resistor type. The mixture is raised to a temperature of approximately 2000° F. at which the materials react, part of the oxygen of the manganese dioxid combining with sulfur of the molybdenite to produce sulfur dioxid which passes off as a gas, and the remaining mass forming a molybdenum-manganese-sulfid compound.

The compound thus formed is then oxidized while in a molten state, preferably by blowing it with an oxygen-containing fluid such as steam or air, it having been found that as a result of such oxidation various changes occur which render the process highly suitable for its intended purpose. In the first place, the compound is desulfurized, the sulfur passing off chiefly as sulfur dioxid, although some passes off as hydrogen sulfid gas, the hydrogen being derived from the dissociated steam in case the compound is blown by steam. Secondly, the molybdenum sublimes as a trioxid, the ultimate product desired, and readily condenses at a temperature of about 800° F. The mingled sulfur gases and molybdenum trioxid are conducted from the furnace to a suitable condenser in which the trioxid is recovered at a temperature below that at which it sublimes, and materially above that at which any of the sulfur gases condense. Accordingly, the molybdenum trioxid is recovered in a high state of purity. Finally, as a result of oxidization of the mass, the manganese is again converted into manganese dioxid with which further molybdenite may be mixed to continue or repeat the process.

It has been found that there is nearly sufficient heat generated by the burning or oxidation step to maintain the mass in a molten condition, so that after the initial mixture of molybdenite and manganese dioxid has been heated to the reaction temperature little further heat need be applied.

The process is especially well suited to continuous operation, which may be carried out either by alternately oxidizing and adding molybdenite to the molten mass, or by simultaneously blowing the mass and supplying it with molybdenite without interruption.

The economical and practical character of the process is readily apparent. After the process has been set in operation, only a very small amount of manganese dioxid need be added to the molten mass to maintain the operation continuous, a slight additional amount being required from time to time to compensate for the removal of such manganese as may combine with the impurities of the molybdenite. In addition to the inconsiderable cost of the small amount of manganese dioxid required to support or conduct the process, little heat need be applied after the mass has been once heated up to the reaction temperature.

I claim:

1. The process of producing molybdenum trioxid, which consists in causing an oxid of manganese to react with molybdenite at an elevated temperature, and in supplying oxygen to the resulting heated mass.

2. The process of continuously producing molybdenum trioxid, which consists in supplying oxygen to a molten body resulting from a reaction between molybdenite and a metallic oxid at an elevated temperature, and in adding molybdenite to said molten body.

3. The process of continuously producing molybdenum trioxid, which consists in supplying oxygen to a molten body resulting from a reaction between molybdenite and an oxid of manganese at an elevated temperature, and in adding molybdenite to said molten body.

4. The process of producing molybdenum trioxid, which consists in causing manganese dioxid and molybdenite to react with each other at an elevated temperature, and in supplying oxygen to a resulting mass by blowing it with an oxygen-containing fluid.

5. The process of continuously producing molybdenum trioxid directly from molybdenite, which consists in causing manganese dioxid and molybdenite to react with each other at an elevated temperature, continuously supplying oxygen to the resulting mass by blowing it with an oxygen-containing fluid, and adding molybdenite to said mass.

In testimony whereof I have hereunto set my hand.

JOSEPH W. WEITZENKORN.

Witnesses:
WM. A. WEIS,
KATHRYN E. ABER.